Patented Feb. 3, 1948

2,435,524

UNITED STATES PATENT OFFICE 2,435,524

MAKING ACETYLENIC ALCOHOLS AND INTERMEDIATE FORMED THEREIN

Charles Weizmann, London, England, assignor to Polymerisable Products Limited, London, England, a British company No Drawing. Application March 16, 1945, Serial No. 583,177. In Great Britain April 18, 1941

Section 1, Public Law 690, August 8, 1946
Patent expires April 18, 1961

19 Claims. (Cl. 260—638)

The present invention relates to improvements in carrying out the reaction of acetylenic hydrocarbons with aldehydes and ketones.

It has long been known that acetylene will react with an aldehyde or a ketone in the presence of powdered KOH, in cold ether as a solvent medium or reaction vehicle. This method has not given satisfactory yields.

Recently, my co-workers, Zeltner and Genas, in U. S. Patent 2,345,170, have improved upon the prior practice, by using as the solvent or reaction vehicle, dimethyl formal.

The present case is a continuation in part of my copending applications 464,790, filed Nov. 6, 1942, and 493,301, filed July 2, 1943, both of which are now abandoned.

In the first of these, a process is described for making acetylenic carbinols and diols, by reacting an acetylenic hydrocarbon (e. g. $C_2H_2$) with a ketone or aldehyde in the presence of a solid complex of caustic potash with a liquid substance selected from the group consisting of acetals, ketals, ethylene glycol dialkyl ethers and homologues of the latter, and which liquid preferably has a high boiling point, and in the presence of an excess of the latter, as a reaction vehicle.

In 493,301, the complex is preferably produced in a microcrystalline state, in which it has a higher activity, and the process can be used for the removal of acetylene hydrocarbons from butadiene, the latter being thereby purified.

As a basis of the present invention, I have found that the activity of potassium hydroxide in promoting the reaction of acetylenic hydrocarbons with aldehydes and ketones is markedly increased, when the reaction is carried out in solvents of high boiling point (B. P. above 100° C. and preferably B. P. above 150° C.) and of the general type

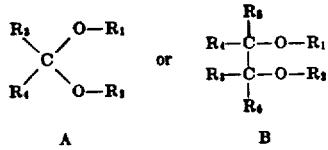

A                B in which $R_1$ and $R_2$ are alkyl groups, $R_3$, $R_4$, $R_5$, $R_6$ are hydrogen atoms or alkyl groups (A acetals or ketals or B ethylene glycol dialkyl ethers or homologues of the latter).

These substances apparently form with the potassium hydroxide oxonium compounds (which are solid complexes) in which the activity of the KOH appears highly increased. As a matter of fact, the presence of two ether-oxygen atoms in immediate vicinity to each other, (i. e. separated by at least one and not more than two carbon atoms) favors the formation of the activated potassium hydroxide complex. The occurrence of a chemical reaction between the hydroxide and the above-defined type of compounds such as butyraldehyde-dibutyl-acetal, ethylene glycol dibutylether, propylene glycol diethyl ether and the like, can be concluded from the fact that the addition of potassium hydroxide to these solvents is invariably accompanied by a distinct rise of the temperature. If all the reagents are pure, the complex is colorless. But using less pure reagents it may be yellowish.

I refer herein to the said organic liquid vehicle (acetals, ketals, and glycol ethers) by the name "solvents" since they dissolve the acetylene and ketone or aldehyde and the acetylenic alcohol produced. However, they do not dissolve the caustic potash nor the complex formed.

Ether (i. e., diethyl ether) as a solvent, favors the reaction between the aldehyde or ketone and the acetylenic compound, (in the presence of caustic alkali) to a greater extent than does benzene, but ether does not form the active complex, which it cannot do, since it does not contain the two neighboring oxygen atoms.

The present invention is therefore concerned with the use of the above defined high boiling solvents for the purpose indicated in combination with solid complexes mentioned. The process may be carried out in the case of acetylene itself according to one of the following methods:

(a) The solid complex, with an excess of the chosen liquid vehicle, as described below, is strongly cooled, e. g. to 0° C. and preferably to —10 to —15° C. Then about 60% of the acetylene required is passed into the mixture, which may be a liquid suspension or pasty; it is absorbed with great rapidity. Then the carbonyl compound (i. e. the aldehyde or ketone to be reacted with the acetylene) in 60% of the intended amount is now slowly added. This produces a vivid reaction which is governed by careful control of temperature and speed of addition. The temperature is preferably below 0° C. during the reaction. The remaining acetylene and carbonyl compound are then introduced into the mass in portions alternately, while still at or below 0° C., and the reaction is completed by allowing the product to stand at room temperature, e. g. for 1-2 hours or longer, and/or by warming the reaction mixture.

(b) Powdered calcium carbide is added, while cooling, to the selected solvent mixed with the complex; when spontaneous reaction has ceased, the carbonyl compound is added slowly.

In both these cases the relative amounts of the reactants can be chosen so that either 1 or 2 mol. of the carbonyl compound react with 1 mol. acetylene.

(c) For monosubstituted acetylenes such as amyl-acetylene or phenyl-acetylene, the procedure of case (a) may be changed in so far as a mixture of the carbonyl compound and the acetylene derivative is added with suitable speed and under temperature control to the addition product (hereinafter termed "complex" for brevity) of potassium hydroxide and the selected activating solvent, mixed with an excess of the latter.

The control of the reaction is so much facilitated by the application of the solvents defined, that it is possible to obtain at will with one molecule of acetylene the reaction products deriving from one or two molecules of the carbonyl compound (monovalent acetylenic carbinols or glycols thereof).

Methylal $CH_2(OCH_3)$ has convenient solvent properties, but its recovery and complete separation of the reaction products is difficult due to its low boiling point (42° C.) and it has insufficient stability towards aqueous alkali. Another, more fundamental objection is discussed in the fifth paragraph below. A better solvent for the reaction between acetone and acetylene in view of its suitable boiling point is ethylene-glycol-ethyl-butyl-ether which boils at atmospheric pressure, at 162° C.

Another excellent solvent for use in this invention is butyraldehyde-dibutyl acetal (B. P. 214–215° C.) which gives under the same conditions up to 95% of the theory, of methyl-butinol or a mixture of it with tetramethyl-butine-diol. It is interesting to note that in dibutyl-ether as the reaction vehicle, which has a desirable boiling point but which has not the required structure, the yields are only 20–25% and 7–8%, respectively, of the two products mentioned.

The following examples illustrate how the invention may be carried out in practice, but it is to be understood that the invention is in no way limited to the details given in these examples. Parts are by weight (except where otherwise indicated).

Preparation of the active complex. If solid potassium hydroxide is added to an excess of the cold liquid of the kind above stated (e. g. to acetaldehyde dibutyl acetal, B. P. 187° C.) and the mixture heated to about 150° C., or if the solid KOH is added to the said liquid already heated to about that temperature, and in either case the heated mixture is allowed to settle after agitation, two liquid layers will be formed, i. e. a lower layer of the molten complex of 1 mol. KOH and 1 mol. of the acetal and an upper layer consisting of the excess of said acetal. This mass is then cooled during vigorous agitation whereby the complex solidifies to a microcrystalline solid, colorless if pure, which will be suspended in the excess of the acetal. If the acetal contained some free aldehyde, the mixture may be yellowish in color, due to the formation of resinous bodies from the aldehyde.

It will be understood that if the two layers are cooled without agitation, the lower layer will solidify as a cake, in the bottom of the receptacle.

The use of acetals, ketals and dialkyl ethers of ethylene glycol and of its homologues, which boil at above the melting point of the complex (usually above 100° C., and usually not considerably above 150° C.) is therefore a considerable improvement over the use of dimethyl formal (of low boiling point) as enabling the easy conversion of all of the KOH into the form of the microcrystalline complex, in an excess of the said reaction vehicle. In this form, very complete utilization of the KOH is possible. Also a further advantage consists in the fact that after the reaction is over, separation of the products of the reaction from the reaction vehicle by fractional distillation is facilitated. Due to the microcrystalline conditions of the complex, it is extremely active.

When a dimethyl formal is mixed with solid KOH, in a powdered state, a similar complex may form on the surface of the particles of KOH, leaving the inner portion of each particle unconverted. It would be possible to heat such a mixture to above the melting point of the complex, under pressure, to convert all the KOH into the complex.

One particular advantage is the fact that the caustic potash to be used can be in the form of lumps, chips, flakes or sticks, and does not have to be pulverized. Puverizing solid caustic potash is a troublesome operation. The KOH, when added to the high boiling liquid is preferably dry (i. e. it preferably does not contain more than 5–10% of water). Anhydrous KOH is much better. Absolute purity is not necessary.

It may be noted that while NaOH and KOH are, in most chemical processes, considered as chemical equivalents, KOH is outstandingly better than NaOH in the present process, the advantages far outweighing the difference in cost.

The complex formed with the high boiling liquid could be isolated by cooling without agitation, subsequently breaking up the cake and removing the excess of solvent, e. g. by washing with diethyl ether, all without too much exposure to air containing carbon dioxide or moisture, e. g. in an atmosphere of dry nitrogen. In the practice of the invention, there is no need to isolate the complex.

*Example 1.—Acetone and calcium carbide in acetaldehyde dibutyl acetal*

56 parts of potassium hydroxide (1 mol.) were added in small portions to 350 parts of acetaldehyde bibutyl acetal (2 mols.), the mixture heated until wholly molten (e. g. at 150° C.), and cooled while being vigorously and continuously stirred. Then 90 parts finely ground calcium carbide (1.1 mol.) and during 0.5 hour 58 parts (1 mol.) anhydrous acetone were added. During this treatment, the temperature is kept at or below 0° C. Then let warm up to room temperature for 1-2 hours. The reaction mixture was decomposed with 20 parts of ice water. The liquid product settles into two layers. Optionally the aqueous layer is neutralized with hydrochloric acid and extracted with the acetal. Distillation of the combined acetal solution gave 17.9% 3-methyl-butinol-(3) and 63.4% tetramethyl-butine-diol. The former distilled between 95-99° C.; the latter at 90-92° C. under 16 mm. pressure. The diol crystallized and had M. P. 94° C. after a trituration with low-boiling petroleum ether.

It appears that the lack of homogeneity of the reaction mixture during the reaction is the cause of the high percentage of diol formed. The following figures, however, obtained under identical conditions, show the superiority of this acetal over ethers containing only one oxygen atom, as the solvent.

| Solvent | Methyl-butinol | Diol. |
|---|---|---|
| | Per cent | Per cent |
| Ether at 0° C | 3.4 | 36.2 |
| Ether at −10° C | 2.6 | 35.2 |
| Dibutyl ether at 0° C | 2.4 | 10.0 |

*Example 2.—Phenyl-acetylene and acetone*

27 parts phenyl-acetylene and 29 parts acetone were mixed and introduced at 0° C. into a liquid suspension made from 150 parts ethylene-glycol-ethyl-butyl-ether and 30 parts powdered potassium hydroxide. After 24 hours at room temperature, the mass was saturated with solid carbon dioxide, filtered and distilled, first at ordinary pressure, then in vacuo. The reaction product, 1-phenyl-3-methyl-butinol-(3) boiled in vacuo at 136° C. and crystallised at once on trituration with petroleum ether. Yield, 40 parts.

*Example 3.—Acetone and acetylene in methyl-isobutyl-dioxolane*

150 parts of powdered potassium hydroxide were slowly added to 780 parts methyl-isobutyl-dioxolane (ketal from ethylene glycol and methyl-isobutyl-ketone) (2 mols. per mol. KOH). The mixture was heated for 1 hour at 150° C. with vigorous stirring and then cooled to −5° C., the stirring being continued. 15.7 liters of acetylene (70% of the total) were introduced into the pasty, usually yellow to reddish product, and were rapidly absorbed. Now 58 parts of acetone were slowly added together with the remainder (6.7 liters) of the acetylene, the temperature always being kept at 0° C. The stirring was continued at this low temperature for a further two hours and the reaction completed by letting stand at room temperature for several hours. Then a small amount (e. g. 300 parts) of ice water was added and the mass settled into two layers, the upper layer was drawn off, saturated with gaseous or solid carbon dioxide. This liquid was then thoroughly dried with magnesium sulphate and was fractionally distilled. Yield of methyl-butinol 66.7%, of tetramethyl-butine-diol 26.8%, these percentages being based on the theoretical quantities.

While a good total yield can always be obtained, the ratio between the two reaction products depends on the intensity of stirring and the amount of potassium hydroxide used.

*Example 4.—Acetone and acetylene in ethylene-glycol-ethyl-butyl-ether*

It has been found advantageous to use 58 grams acetone, 1000-1500 grams of the said solvent and 100-150 grams potassium hydroxide which is 2-3 times the theoretical amount, and 22.4 liters of acetylene. Combining the solvent with the potassium hydroxide, an extremely voluminous gelatinous complex is formed which requires very efficient stirring. On reaction with acetylene the mass becomes much thinner, but on interaction with acetone very thick again.

After decomposition by hydrolysis and settling into two layers, the separation of the reaction product from the upper layer is carried out as follows: In an efficient column the methyl-butinol distils in the range 85-110° C. Then the solvent (B. P. 162° C.) is distilled over, except a residue of 100 cc. (on 1000-1500 cc. used). To this residue petroleum ether is added, which precipitates completely the tetramethyl-butine-diol. After filtration, the solvents are recovered.

The total yield in both reaction products is substantially quantitative.

*Example 5.—Reaction of "potassium acetylide" with acetone in acetaldehyde dibutyl acetal*

24.8 kg. potassium hydroxide and 66 kg. (82.5 liters) acetal were gradually heated up to 150° C. with vigorous stirring and kept at this temperature for about 30 minutes. Then the mixture was cooled down, while being vigorously stirred, to −12° C. When 0° was reached, the introduction of acetylene was commenced, of which a total of 5.73 kg. (181.44 cu. ft.) is required. About 50% of it is so readily absorbed that hardly any gas leaves the reaction mixture (at least in the beginning). When the absorption slows down, one begins (at not above −12° C.) the addition of 12.86 kg. (=16.07 liters) acetone, while continuing the introduction of acetylene. Always at least a slight excess of acetylene was present. The reaction is strongly exothermic, and care had to be taken to keep the temperature below −10° C. (The cooling plant, required for the above quantities, must supply 1,200 frig. per hour.) All of the 5.73 kg. of acetylene and 12.86 kg. of acetone was added, while stirring the reaction mixture. After a further 2 hours continued stirring, 50 kg. crushed ice were added and the stirring continued for 1 hour. Then the mass was allowed to settle. When the two layers have been separated, the lower one (aqueous KOH solution) is withdrawn (and can be used for the recovery of the hydroxide); the upper layer is treated with 1 kg. dry ice and directly can be fractionated. A yield of up to 95% methyl-butinol is obtained, B. P. 95-105° C. The solvent is re-used without previous re-distillation. Hardly any acetone was recovered or any by-products formed under these conditions. If the temperature rises unduly during the reaction, small quantities of mesityl oxide (B. P. 126°) appear in the product, and a certain quantity of methyl-butinol decomposes into acetylene and tetramethyl-butine-diol. Notes.—This process has also been operated on a semi-commercial scale with like results.

The sequence in which the two reactants are introduced is immaterial as the following experiments show: The complex was prepared from 400 g. potassium hydroxide and 1250 cc. of the acetal. Then while keeping the mixture at exactly −10° C,. 164 cc. (131 g.) acetone were added during 1 hour; then the introduction of acetylene was carried out, while maintaining the temperature of the reaction mixture at −10° C., which took 80 minutes. The mass was then allowed to warm up to room temperature, and 500 cc. ice water were added. Fractionation of the resulting solution gave 46 cc. (=36.8 g.) unchanged acetone and 134.8 g. methyl-butinol. Calculated on the acetone, used up in the reaction, the yield was 98.7%. This method might have some practical advantages, as the presence of acetone increases the solubility and rate of absorption of the acetylene; the total time of the process is, therefore, reduced. Special experiments have shown that the contact with the complex at −10° C. for 175 minutes, hardly affected the acetone: 95.4% could be recovered, and only a small quantity of a higher-boiling oil was observed, which exhibited the characteristic odour of mesityl oxide.

The reaction can be carried out in sheet-iron vessels; the traces of ferric hydroxide which invariably contaminate the reaction product have no appreciable effect on the yield.

It appears advisable to work under as dry conditions as possible. The deliberate addition of a small quantity of water tends to decrease the conversion (not the yield) somewhat.

To the complex made from 275 g. potassium hydroxide and 900 cc. of the acetaldehyde dibutyl acetal, 15 cc. water were added, before the acetylene (2 cu. ft.=54 l.) was introduced. When 1.14 cu. ft. had been absorbed (after 40 minutes), the acetone (177 cc.—141.6 g.) was added simultaneously with the balance of the acetylene. This operation required 65 minutes; otherwise, the temperature could not be maintained at −12° C. After further 2 hours, 550 cc. cold water were added. Distillation gave 66 cc. (=52.8 g.;=37% of the total) unchanged acetone and 109 g. methyl-butinol, corresponding to 85% (calculated on the acetone, entered into reaction).

*Example 6.—Reaction of methyl-isobutyl-ketone with "potassium acetylide"*

The complex, formed from 370 g. potassium hydroxide and 825 cc. acetaldehyde dibutyl acetal, was used to effect the condensation between 268 g. (335 cc.) methyl-isobutyl-ketone and 2.5 cu. ft. (=67.5 l.) acetylene in the above manner at 0° C. The reaction was strongly exothermic, the reaction heat being removed by constant refrigeration, to hold the reaction mass at 0° C. The stirring was continued for 2 hours at the same temperature, and 500 cc. ice-water were added. The usual treatment of the reaction product showed that the interaction had not lasted long enough; considerable quantities of methyl-isobutyl-ketone were recovered. Fractionation gave:

120 cc.=96 g. methyl-isobutyl-ketone, B. P. 112–115°
153 cc.=131 g. isobutyl-butinol, B. P. 146–147°

As 36% of the ketone was thus recovered, the yield in tertiary alcohol was 60.4%, calculated on the ketone entered into reaction.

*Example 7*

Under other experimental conditions, much better results were achieved: To 1000 cc. acetaldehyde diethyl acetal, 450 g. powdered potassium hydroxide were added at −10° C. Then the temperature was lowered to −25° C. and 4.5 cu. ft. (121.5 l.) acetylene were absorbed, while at −25° C. This was done in order to have always a considerable excess of acetylene present 300 cc. (240 g.) methyl-isobutyl-ketone were then slowly added (during about 90 minutes with vigorous stirring. This caused the temperature to rise to −10° C., and, therefore, a certain amount of acetylene (0.5 cu. ft.=13.5 l.) escaped, which had been only physically dissolved. The mixture was kept at −15° C. for 15 hours and then hydrolysed with 700 cc. water. Redistillation of the fraction 130–148° gave isobutyl-butinol as a colorless liquid of B. P. 145–147°, in a yield of 240 g. (=80% of theory). Only negligible amounts of the ketone were recovered, but a higher fraction (B. P. about 200° C.) was collected, which did not give a precipitate with ammoniacal silver nitrate solution and was presumably the corresponding diol.

*Example 8.—Methyl-ethyl-ketone and "potassium acetylide"*

The procedure was essentially the same as in the case of acetone (Example 5).

900 g. acetaldehyde dibutyl acetal
300 g. potassium hydroxide
2.2 cu. ft. (59.4 l.) acetylene
250 cc. (200 g.) methyl-ethyl-ketone The temperature was kept between −10° and 0° during the reaction; 400 cc. of water were used for the hydrolysis of the product. No appreciable amount of the diol was formed under these conditions. From the fraction boiling between 100–130°, 210 cc. of the product (B. P. 117–122°) were obtained upon redistillation. Yield, 165 g. ethyl-butinol=60%.

*Example 9.—Pinacolone and "potassium acetylide"*

The procedure for pinacolone was the same as in the case of methyl-isobutyl-ketone (Example 6). The following quantities were applied:

600 cc. methyl-ethyl-dioxolane
300 g. potassium hydroxide
2.5 cu. ft. (67.5 l.) acetylene
200 cc. (160 g.) pinacolone (addition within 2 hours)

The reaction product was left at 0° C. for 2 days, before working it up.

The fraction 140–145° C. was collected; only a negligible amount of the diol was formed. The pure tert. butyl-butinol (2.2.3-trimethyl-4-pentine-3-ol) boils at 143–144° C. Yield, 150 cc.—120 g. (the yield is 60% based on the pinacolone used up).

A sample of the product was subjected to ultimate analysis, with the following results:

Found: C—75.5, 75.9; H—10.9, 11.3. Calc. for C8H14O: C—76.1; H—11.2.

During the preliminary experiments, relatively large amounts of the diol were obtained, viz. if the temperature of the reaction was allowed to rise above 0°, or if the reaction times were longer than 2 days. The diol was distilled in vacuo (10 mm.), boiling at 130° C. The 2.2.3.6.7.7-hexamethyl-4-octine-3.6-diol was recrystallised from petroleum ether. Needles, M. P. 89°.

Analysis of the diol formed, showed the following:

Found: C—74.1, 74.5; H—11.5, 10.9. Calc. for C14H26O2: C—74.3; H—11.6.

*Example 10.—Acetophenone and "potassium acetylide"*

700 cc. acetaldehyde dibutyl acetal
400 g. potassium hydroxide
25 cu. ft. acetylene
200 cc. (200 g.) acetophenone A large excess of acetylene had to be used, as preliminary experiments had proved that acetophenone tends to form the diol. After introduction of the components, the reaction product was left at 0° C. for 15 hours. It was hydrolysed with 400 cc. of water. Fractionation of the acetal layer in vacuo did not yield a pure product, as acetophenone and phenyl-butinol have boiling points close together. The fraction boiling from 90–125° at an absolute pressure of 20 mm. mercury (100 g.) was therefore isolated. Determination of the content in butinol by precipitation with ammoniacal silver solution showed that this fraction was 94% pure. From the silver salt with dilute nitric acid, the pure 2-phenyl-3-butin-2-ol could be isolated; M. P. 49°.

The diol formation in this run was negligible. In preliminary runs the diol was formed to a large extent (higher temperature, longer reaction time, higher acetophenone-acetylene ratio). The diol was precipitated from the residue of the vacuum distillation of phenyl-butinol by means of petroleum ether and recrystallised from methanol. M. P. 165°.

Analysis of the product showed the following:
Found: C—81.9; H—6.8. Calc. for $C_{10}H_{10}O$: C—80.9; H—6.7.

I have found that this reaction constitutes a practical method of removing acetylene, vinyl acetylene, ethyl acetylene, di-acetylene, methyl acetylene, amyl acetylene, phenyl acetylene, and other acetylenic hydrocarbons from gases or vapors containing such acetylenic hydrocarbons admixed with other hydrocarbon gases and/or vapors. Thus this reaction can be suitably employed in the removal of acetylenic hydrocarbons from crude butadiene, and the present disclosure constitutes a solution of one of the difficulties in the production of synthetic rubber ("Buna rubber") on a commercial scale and at moderate cost. The percentage of acetylenic hydrocarbons present in the crude butadiene is variable, depending on its mode of production, and in some cases may be around 10%.

In such a process, the term "acetylene" or "acetylenic hydrocarbon" is intended to cover a hydrocarbon containing the terminal grouping —C≡CH. This group can exist attached to hydrogen, alkyl, aryl, aralkyl, alkaryl, or other hydrocarbon radical, monovalent or polyvalent. These compounds all contain a terminal

or in other words they have a hydrogen atom in the 1-position.

Any gas or vapor which is inert to caustic potash and which contains, mixed therewith, acetylenic hydrocarbons possessing a terminal triple bond (which will hereinafter be termed "acetylenes," for brevity), can be freed from such acetylenes by treatment with the complex of KOH and a compound of the type —O—C—O— or —O—C—C—O— as defined above. This process can be used for the often desirable removal of small percentages of acetylenes from industrial waste gases, i. e., gases which contain an acetylene, or from the crude butadiene containing acetylenes.

The acetylenes, after interaction with the complex, can either be recovered as such, inter alia by hydrolysis of the acetylide, or can be used in the form of the acetylides for various reactions, such as react. n with a ketone or an aldehyde.

*Example 11.—Removal of acetylenes from butadiene*

When a crude butadiene containing 10% of acetylenes (hydrocarbons having a terminal triple bond —C≡CH) was bubbled at a temperature between 0° C. and —10° C., through the suspension of the said complex made from potassium hydroxide and acetaldehyde dibutylacetal in the above way, the content of acetylene compounds in the butadiene after a single passage had dropped to 3.0%. Repeated treatment decreased this figure further. (Instead of this procedure, a suitable absorption tower can be used, the suspension of the complex fed in at the top and the gases at the bottom. Due to the better contact of the gases and vapors with the complex, the whole or practically the whole of the acetylenes can thus be absorbed and thus removed, leaving the butadiene thereby purified.)

The reaction product was then reacted with acetone and gave, inter alia, a carbinol which was believed to be 2-methyl-5-hexene-3-yne-2-ol,

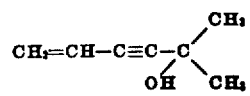

In a particular instance, the following details were noted, to which the present invention is not restricted.

13 cubic feet of impure butadiene were passed at a temperature between 0° C., and minus 10° C., through the suspension of the complex, made in the above way from 180 g. potassium hydroxide and 800 cc. acetaldehyde-dibutyl-acetal, at a velocity of 1 cubic foot per hour. The exit gas had an acetylene content of 3.0%, 0.9 cubic foot of the acetylenic gas had been absorbed, and the absorption product was treated with 60 g. acetone at about —10° C. The reaction product was decomposed with 360 cc. of water and separated into two layers. The lower layer is an aqueous solution of caustic potash, and the upper layer is a solution of the reaction products in the excess of acetal. The acetal layer, after a short treatment with Dry Ice was distilled. The following fractions were isolated:

(1) 70–87° 28 cc.=21 g.
(2) 94–118° 26 cc.=21 g.; $d=0.8119$; $n_D^{20}=1.4127$
(3) 130–170° 23 cc.=19 g.; $d=0.8264$; $n_D^{20}=1.4150$
(4) 174–176° 50 cc.=41 g.; $d=0.8223$; $n_D^{20}=1.4068$; B. P. at 13 mm.=76.8° C.

The last fraction corresponds in properties to the substance

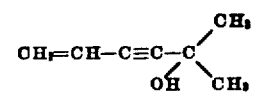

In treating crude butadiene, it will be understood that the temperature of the absorbent and of the gases, and the rate of flow of these, are preferably so adjusted that the butadiene itself does not liquefy, or at any event does not remain in liquefied state, in the liquid leaving the bottom of the column. It would thus be suitable if the liquid enters the column at —8 to —10° C., and leaves the column at —2 to —4° C.

In the above Example 11, the butadiene can be considered as a material (gas or vapor) which is inert, i. e. it does not combine with the complex, and the acetylenes (i. e. the impurities to be removed) can be considered as the reactive material, i. e., they combine with the complex.

The following are given as some additional examples of high boiling point liquids for forming complexes with KOH. The acetals formed by reaction between methyl-ethyl ketone and ethylene-glycol B. P. 117° C.; 2-ethyl-hexanal and methyl alcohol B. P. 163–166° C.; butyraldehyde and propyl alcohol B. P. 182° C.; butyraldehyde and ethyl alcohol B. P. 165° C.

As examples of suitable ketals for use in the process, as the organic liquid, I mention by way of example the following: Ketal between acetone and ethylene glycol (dimethyldioxolan); ketal between acetone and propylene glycol (trimethyldioxolan); ketal between methyl ethyl ketone and ethylene glycol (methyl ethyl dioxolan); ketal between methyl isobutyl ketone and ethylene glycol (methyl isobutyl dioxolan), boiling point 145° C. at 760 mm. and 60° C. at 20 mm.; ketal between acetone and butyl alcohol, B. P. 138° C.; ketal between methyl isobutyl ketone and ethyl alcohol (B. P. 138° C. at 760 mm. and 69° C. at 18 mm.).

As examples of ethylene glycol dialkyl-ethers, I mention the following: Ethylene glycol dibutyl ether (B. P. 202° C.); propylene glycol di-ethyl ether (B. P. 145° C.); ethylene glycol ethyl butyl ether (B. P. 162° C.).

The organic substances mentioned are given merely as examples of suitable vehicles, and the invention is not restricted to the use of these particular bodies (B. P. 202° C.).

In the present case the acetylenic body may be plain (B. P. 145° C.), acetylene $C_2H_2$ or homologues of this, or substituted acetylenes (B. P. 162° C.), such as vinyl acetylene, phenyl acetylene, naphthyl acetylene, calcium carbide, etc.

The ketone may be acetone or its homologues, unsaturated ketones, ketones containing an aryl group, or the like.

The aldehydes can be acetaldehyde, its homologues, aryl substituted aldehydes, aldehydes containing unsaturated substituents, etc.

I claim:

1. In the process for the preparation of secondary and tertiary ethinyl carbinols by the interaction of an acetylenic hydrocarbon with a member of the class consisting of aldehydes and ketones, the improvement which comprises carrying out the reaction at a temperature not substantially above 0° C., in the presence of a suspension of a fluent reaction vehicle comprising a finely divided alkali metal hydroxide with a substantially larger amount of a water insoluble organic liquid containing in its molecular structure, two ether-forming oxygen atoms and having a structural formula selected from the group consisting of

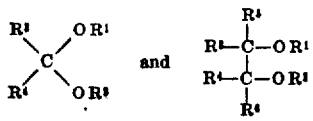

in which $R^1$ and $R^2$ are alkyl groups and $R^3$, $R^4$, $R^5$ and $R^6$ are members of the group consisting of hydrogen atoms and alkyl groups, and which organic liquid has a boiling point substantially above 100° C., the said water insoluble liquid being present as a vehicle in which the potassium compound is suspended.

2. A process as in claim 1, in which the said water insoluble organic liquid is a chemically saturated acetal.

3. A process as in claim 1, in which the said water insoluble organic liquid is a ketal.

4. A process as in claim 1, in which the said water insoluble organic liquid is a dialkyl ether of an ethylene glycol.

5. A process of producing unsaturated alcohols which comprises bringing an acetylenic hydrocarbon and a substance selected from the group consisting of aldehydes and ketones into contact with a suspension of a solid complex of caustic potash with an organic substance containing in its molecular structure two ether forming oxygen atoms and having a structural formula selected from the group consisting of

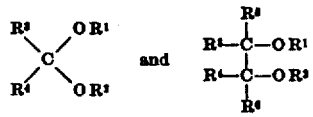

in which $R^1$ and $R^2$ are alkyl groups and $R^3$, $R^4$, $R^5$ and $R^6$ are members of the group consisting of hydrogen atoms and alkyl groups, and which organic substance has a boiling point above 100° C., and said suspension being maintained at not substantially above 0° C., and in said reaction mixture all of the alkali metal present existing as said complex.

6. A process as in claim 5, in which the said complex is in a microcrystalline state.

7. A process of removing an acetylenic hydrocarbon from an elastic fluid mixture containing same, and containing an olefinic hydrocarbon in amount several times greater than the amount of said acetylenic hydrocarbon, which comprises preparing a reagent by adding caustic potash to several times its own weight of a water insoluble organic liquid containing in its molecular structure, two ether-forming oxygen atoms and having a structural formula selected from the group consisting of

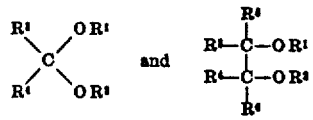

in which $R^1$ and $R^2$ are alkyl groups and $R^3$, $R^4$, $R^5$ and $R^6$ are members of the group consisting of hydrogen atoms and alkyl groups, and which organic liquid has a boiling point substantially above 100° C., the said water insoluble liquid being present in amount substantially greater than the amount of said caustic potash, then heating said mixture until the potassium compound is wholly liquefied, then cooling said liquid mass under strong agitation until the potassium compound exists in said mixture as a microcrystalline solid, cooling said mixture to a temperature not substantially above 0° C., and intimately contacting such elastic fluid mixture with said cooled liquid mixture while the latter is maintained at a temperature not substantially above 0° C.

8. A process as covered in claim 7, in which the product existing at the end of the process of said claim is treated with a member of the class consisting of aldehydes and ketones.

9. A process as covered in claim 7, in which the elastic fluid initially used is a gas consisting essentially of butadiene and an acetylenic hydrocarbon.

10. A process which comprises reacting an acetylenic hydrocarbon with a body containing the =CO radical and selected from the group consisting of aldehydes and ketones, in the presence of a reagent consisting of potassium hydroxide and several times its own weight of an aliphatic organic body which contains in its molecule, two ether-forming oxygen atoms connected to carbon, and said two oxygen atoms being separated from each other by at least one carbon atom but not more than two carbon atoms, and which aliphatic organic body has a normal boiling point substantially above 100° C.

11. As a new product, a solid complex consisting of an alkali metal hydroxide and a water-insoluble organic liquid compound of hydrogen, carbon and oxygen, containing in its molecular structure, two and only two ether-forming oxygen atoms, and having a structural formula selected from the group consisting of

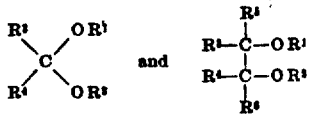

in which $R^1$ and $R^2$ are alkyl groups and $R^3$, $R^4$, $R^5$ and $R^6$ are members of the group consisting of hydrogen atoms and alkyl groups, which organic liquid compound has a boiling point substantially above the boiling point of water.

12. The herein described new material which is a solid complex of an alkali metal hydroxide with a high boiling acetal of which the boiling point is substantially above 100° C., and which complex is a solid which will melt at a temperature below the boiling point of said acetal.

13. A suspension of a solid complex of an alkali metal hydroxide with a water insoluble organic liquid containing in its molecular structure, two ether-forming oxygen atoms and having a structural formula selected from the group consisting of

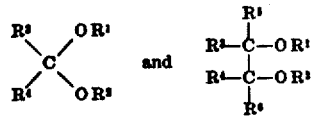

in which $R^1$ and $R^2$ are alkyl groups and $R^3$, $R^4$, $R^5$ and $R^6$ are members of the group consisting of hydrogen atoms and alkyl groups, and which organic liquid has a boiling point substantially above 100° C. and an excess of said water insoluble liquid being present as a vehicle in which said complex is suspended.

14. A process which comprises the steps of heating to a temperature somewhat over 100° C. potassium hydroxide in an organic liquid containing in its molecular structure two ether forming oxygen atoms and having a structural formula selected from the group consisting of

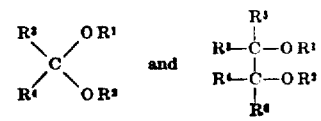

in which $R^1$ and $R^2$ are alkyl groups and $R^3$, $R^4$, $R^5$ and $R^6$ are members of the group consisting of hydrogen atoms and alkyl groups, and which organic liquid is insoluble in water and which has a boiling point above 100° C., the amount of said organic liquid being greater than the amount of the potassium compound, until said potassium hydroxide is converted into a liquid condition, and thereafter cooling said liquid mass while vigorously agitating the same, whereby a suspension of solid potassium compound in a very finely divided state, in said liquid, results.

15. A process which comprises the steps of heating to a temperature somewhat over 100° C. potassium hydroxide which is solid at room temperature, which contains some water, in an organic liquid containing in its molecular structure, two ether-forming oxygen atoms and having a structural formula selected from the group consisting of

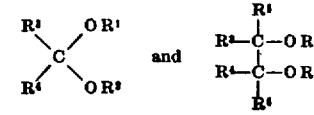

in which $R^1$ and $R^2$ are alkyl groups and $R^3$, $R^4$, $R^5$ and $R^6$ are members of the group consisting of hydrogen atoms and alkyl groups, which organic liquid is insoluble in water and which has a boiling point above 100° C., the amount of said organic liquid being at least several times greater than the amount of said potassium hydroxide, until the potassium compound is converted into a liquid condition, and thereafter cooling said liquid mass while vigorously agitating the same, whereby a suspension of solid potassium compound in a very finely divided state, in said liquid, results.

16. In the production of an acetylenic alcohol, the steps which comprise adding potassium hydroxide to an ether compound having a boiling point substantially above 100° C., such ether compound having a structural formula selected from the group consisting of

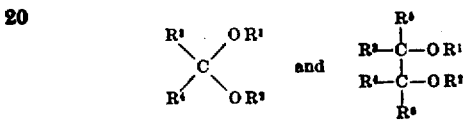

in which $R^1$ and $R^2$ are alkyl groups and $R^3$, $R^4$, $R^5$ and $R^6$ are members of the group consisting of hydrogen atoms and alkyl groups, heating such mixture until complete liquefaction has taken place, cooling such mixture while vigorously agitating same, to thereby form a suspension of extremely finely divided particles of potassium compound suspended in a larger amount of such ether compound, absorbing an acetylenic hydrocarbon having a hydrogen atom in the 1-position in said suspension while at a temperature not substantially above 0° C., adding to the resulting mixture a carbonyl compound selected from the group consisting of aldehydes and ketones to produce the potassium derivative of an acetylenic alcohol, hydrolyzing said potassium compound with water to produce a mixture containing the acetylenic alcohol, said ether compound, water and potassium hydroxide and recovering said alcohol, said ether compound and said potassium hydroxide from the product of such hydrolyzing step, whereby said ether compound and said potassium hydroxide can be reused in the process.

17. In the production of an acetylenic alcohol, the steps which comprise mixing solid potassium hydroxide with several times its own weight of a liquid ether compound having a boiling point substantially above 100° C., which ether compound is substantially insoluble in water and has a boiling point above 100° C., and contains in its molecular structure two ether-forming oxygen atoms and has a structural formula selected from the group consisting of in which $R^1$ and $R^2$ are alkyl groups and $R^3$, $R^4$, $R^5$ and $R^6$ are members of the group consisting of hydrogen atoms and alkyl groups, heating such mixture until the potassium compound present is in a molten condition, agitating such mixture while cooling same to substantially below the melting point of the potassium compound, whereby the latter solidifies in a finely divided state to form a suspension of such finely divided potassium compound in such liquid ether compound, further cooling such suspension at least down to about 0° C., introducing an acetylenic hydrocarbon containing a hydrogen atom in the 1-position into said cooled suspension while at such low temperature, introducing a carbonyl compound selected from the group consisting of aldehydes and ketones into such cooled suspension, whereby the potassium derivative of an acetylenic alcohol is produced, and adding water to the reaction mixture to hydrolyze said potassium derivative of the acetylenic alcohol.

18. The herein described process of producing an acetylenic alcohol which comprises mixing an acetal having a boiling point substantially above 100° C., with KOH containing some moisture, heating such mixture to substantially above 100° C. until the potassium compound present is entirely in a liquefied condition in the absence of such an amount of water as would dissolve same at room temperature, cooling such mixture while vigorously agitating same and continuing such cooling and agitation until the temperature of the mixture is not substantially above 0° C., whereby the potassium compound present will remain in a substantially microcrystalline condition, adding to such mixture while maintained at not substantially above 0° C., a substance selected from the group consisting of acetylenic hydrocarbons and calcium carbide and adding a carbonyl-containing compound selected from the group consisting of ketones and aldehydes, while maintaining the reaction mixture at not substantially above 0° C., thereafter, when the reaction has slowed down, warming the reaction mixture at least to normal room temperature, whereby a potassium compound of such acetylenic alcohol is formed, thereafter adding cold water to the reaction mixture in amount sufficient to effect hydrolysis of the potassium compound of the acetylenic alcohol and to form an aqueous solution of potassium hydroxide, and thereafter separating the acetylenic alcohol formed and recovering the potassium hydroxide for reuse in the manufacture of acetylenic alcohol.

19. The herein described process of producing an acetylenic alcohol which comprises mixing a dialkyl ether of a glycol, which ether has a boiling point substantially above 100° C., and which ether contains two oxygen atoms separated from each other by two carbon atoms, with KOH containing some moisture, heating such mixture to substantially above 100° C. until the potassium compound present is substantially entirely in a liquefied condition in the absence of such an amount of water as would dissolve same at room temperature, cooling such mixture while vigorously agitating same and continuing such cooling and agitation until the temperature of the mixture is not substantially above 0° C., whereby the potassium compound present will remain in a substantially microcrystalline condition, adding to such mixture a substance selected from the group consisting of acetylenic hydrocarbons and calcium carbide and adding a carbonyl-containing compound selected from the group consisting of ketones and aldehydes, while maintaining the reaction mixture at not substantially above 0° C., thereafter, when the reaction has slowed down, warming the reaction mixture at least to normal room temperature, whereby a potassium compound of such acetylenic alcohol is formed, thereafter adding sufficient cold water to the reaction mixture to effect hydrolysis of the potassium alcoholate and to form an aqueous solution of potassium hydroxide, and thereafter separating the acetylenic alcohol formed and recovering the potassium hydroxide for reuse in the process.

CHARLES WEIZMANN.

REFERENCES CITED

The following references are of record in the file of this patent:

UNITED STATES PATENTS

| Number | Name | Date |
|---|---|---|
| 2,345,170 | Zeltner et al. | Mar. 28, 1944 |

FOREIGN PATENTS

| Number | Country | Date |
|---|---|---|
| 264,245 | Germany | Sept. 9, 1913 |
| 268,102 | Germany | Dec. 8, 1913 |
| 314,364 | Germany | Sept. 10, 1919 |
| 115,765 | Australia | Aug. 21, 1942 |

Certificate of Correction

Patent No. 2,435,524

February 3, 1948

CHARLES WEIZMANN

It is hereby certified that error appears in the printed specification of the above numbered patent requiring correction as follows:

Column 11, line 20, strike out "(B. P. 202° C.)"; line 22, strike out "(B. P. 145° C.)"; lines 23 and 24, strike out "(B. P. 162° C.)";

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.* to about 0° C., introducing an acetylenic hydrocarbon containing a hydrogen atom in the 1-position into said cooled suspension while at such low temperature, introducing a carbonyl compound selected from the group consisting of aldehydes and ketones into such cooled suspension, whereby the potassium derivative of an acetylenic alcohol is produced, and adding water to the reaction mixture to hydrolyze said potassium derivative of the acetylenic alcohol.

18. The herein described process of producing an acetylenic alcohol which comprises mixing an acetal having a boiling point substantially above 100° C., with KOH containing some moisture, heating such mixture to substantially above 100° C. until the potassium compound present is entirely in a liquefied condition in the absence of such an amount of water as would dissolve same at room temperature, cooling such mixture while vigorously agitating same and continuing such cooling and agitation until the temperature of the mixture is not substantially above 0° C., whereby the potassium compound present will remain in a substantially microcrystalline condition, adding to such mixture while maintained at not substantially above 0° C., a substance selected from the group consisting of acetylenic hydrocarbons and calcium carbide and adding a carbonyl-containing compound selected from the group consisting of ketones and aldehydes, while maintaining the reaction mixture at not substantially above 0° C., thereafter, when the reaction has slowed down, warming the reaction mixture at least to normal room temperature, whereby a potassium compound of such acetylenic alcohol is formed, thereafter adding cold water to the reaction mixture in amount sufficient to effect hydrolysis of the potassium compound of the acetylenic alcohol and to form an aqueous solution of potassium hydroxide, and thereafter separating the acetylenic alcohol formed and recovering the potassium hydroxide for reuse in the manufacture of acetylenic alcohol.

19. The herein described process of producing an acetylenic alcohol which comprises mixing a dialkyl ether of a glycol, which ether has a boiling point substantially above 100° C., and which ether contains two oxygen atoms separated from each other by two carbon atoms, with KOH containing some moisture, heating such mixture to substantially above 100° C. until the potassium compound present is substantially entirely in a liquefied condition in the absence of such an amount of water as would dissolve same at room temperature, cooling such mixture while vigorously agitating same and continuing such cooling and agitation until the temperature of the mixture is not substantially above 0° C., whereby the potassium compound present will remain in a substantially microcrystalline condition, adding to such mixture a substance selected from the group consisting of acetylenic hydrocarbons and calcium carbide and adding a carbonyl-containing compound selected from the group consisting of ketones and aldehydes, while maintaining the reaction mixture at not substantially above 0° C., thereafter, when the reaction has slowed down, warming the reaction mixture at least to normal room temperature, whereby a potassium compound of such acetylenic alcohol is formed, thereafter adding sufficient cold water to the reaction mixture to effect hydrolysis of the potassium alcoholate and to form an aqueous solution of potassium hydroxide, and thereafter separating the acetylenic alcohol formed and recovering the potassium hydroxide for reuse in the process.

CHARLES WEIZMANN.

REFERENCES CITED

The following references are of record in the file of this patent:

UNITED STATES PATENTS

| Number | Name | Date |
| --- | --- | --- |
| 2,345,170 | Zeltner et al. | Mar. 28, 1944 |

FOREIGN PATENTS

| Number | Country | Date |
| --- | --- | --- |
| 264,245 | Germany | Sept. 9, 1913 |
| 268,102 | Germany | Dec. 8, 1913 |
| 314,364 | Germany | Sept. 10, 1919 |
| 115,765 | Australia | Aug. 21, 1942 |

Certificate of Correction

Patent No. 2,435,524

February 3, 1948

CHARLES WEIZMANN

It is hereby certified that error appears in the printed specification of the above numbered patent requiring correction as follows:

Column 11, line 20, strike out "(B. P. 202° C.)"; line 22, strike out "(B. P. 145° C.)"; lines 23 and 24, strike out "(B. P. 162° C.)";

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*